US012604796B2

(12) United States Patent
Reusch

(10) Patent No.: US 12,604,796 B2
(45) Date of Patent: Apr. 21, 2026

(54) METHOD AND SYSTEM FOR PROVIDING A SITE-SPECIFIC FERTILIZER RECOMMENDATION

(71) Applicant: Yara International ASA, Oslo (NO)

(72) Inventor: Stefan Reusch, Dülmen (DE)

(73) Assignee: YARA INTERNATIONAL ASA, Oslo (NO)

( * ) Notice: Subject to any disclaimer, the term of this patent is extended or adjusted under 35 U.S.C. 154(b) by 72 days.

(21) Appl. No.: 18/687,978

(22) PCT Filed: Aug. 31, 2022

(86) PCT No.: PCT/EP2022/074143
§ 371 (c)(1),
(2) Date: Feb. 29, 2024

(87) PCT Pub. No.: WO2023/031240
PCT Pub. Date: Mar. 9, 2023

(65) Prior Publication Data
US 2025/0113766 A1     Apr. 10, 2025

(30) Foreign Application Priority Data

Sep. 1, 2021    (EP) ..................................... 21194224

(51) Int. Cl.
*A01C 21/00*          (2006.01)
(52) U.S. Cl.
CPC .......... *A01C 21/007* (2013.01); *A01C 21/005* (2013.01)
(58) Field of Classification Search
CPC ............................ A01C 21/007; A01C 21/005
See application file for complete search history.

(56) References Cited

U.S. PATENT DOCUMENTS 9,519,861 B1 * 12/2016 Gates ..................... G06N 20/00
2016/0180473 A1     6/2016 Groeneveld
(Continued)

FOREIGN PATENT DOCUMENTS

CN        109977548 A      7/2019
WO        2020160641 A1     8/2020

OTHER PUBLICATIONS

Preliminary Studies to Characterize the Temporal Variation of Micronutrient Composition of the Above Ground Organs of Maize and Correlated Uptake Rates(Martins) (Year: 2017).*

(Continued)

*Primary Examiner* — William S Brockington, III
*Assistant Examiner* — Theodore Xie
(74) *Attorney, Agent, or Firm* — DILWORTH IP, LLC

(57) ABSTRACT

A computer-implemented method for providing a site-specific variable fertilizer recommendation for a crop at a given point in time, including determining at least one agricultural field including at least one crop, scheduling a fertilization application for the agricultural field, and determining a crop nutrient status of the agricultural field. Determining the crop nutrient status includes receiving remote data, including image data of the agricultural field and a time stamp indicative of when the image data was taken, generating at least one vegetation index indicative of a crop nutrient status based on the image data, and determining a crop nutrient status based on the vegetation index. The method further includes adjusting the crop nutrient status based on the time difference between the time stamp of the image data and the scheduled fertilizer application, and determining a variable fertilizer recommendation for the agricultural field based on the adjusted crop nutrient status.

14 Claims, 5 Drawing Sheets

(56)     References Cited

U.S. PATENT DOCUMENTS

| | | | |
|---|---|---|---|
| 2017/0061052 A1* | 3/2017 | Gates | A01G 25/167 |
| 2020/0019777 A1* | 1/2020 | Gurzoni, Jr. | G06V 10/803 |
| 2020/0125844 A1 | 4/2020 | She | |
| 2021/0144903 A1* | 5/2021 | Javault | A01M 7/0042 |
| 2021/0257112 A1* | 8/2021 | Coffin | G06T 7/97 |

OTHER PUBLICATIONS

International Search Report and Written Opinion issued in App. No. PCT/EP2022/074143, dated Dec. 15, 2022, 12 pages.
International Preliminary Report on Patentability issued in App. No. PCT/EP2022/074143, dated Jun. 16, 2023, 18 pages.

\* cited by examiner

METHOD AND SYSTEM FOR PROVIDING A SITE-SPECIFIC FERTILIZER RECOMMENDATION

TECHNICAL FIELD

The present disclosure relates to a system and method for providing a site-specific variable fertilizer recommendation to crops in agricultural fields.

BACKGROUND

Determining the appropriate amount of fertilizer a crop needs is one of the most important decisions a farmer will encounter. A deficit in nitrogen will reduce yield, while an excess will produce economic losses and damage the environment. A deficit in other nutrients will lead to crop defects and reduced crop quality. Crops, however, present an in-field variability due to the variance in parameters which influence the growth and development of a crop (water, soil properties) and is therefore cumbersome to establish a location dependent fertilizer recommendation which might suit the whole crop at optimum levels.

Amongst the different methods for estimating crop nitrogen levels in crops, the use of remote imagery generated by satellites or other equivalent unmanned aerial vehicles has gained importance due to the availability of public imagery from long standing satellite platforms (SENTINEL and LANDSAT amongst others). Remote sensing allows determination of crop nitrogen levels of remote fields without the need of in-field inspection. However, the use of remote imagery entails well-known disadvantages. Due to limitations in revisit time in combination with cloud occurrence, actual images of sufficient quality are often not available when a fertilizer application is due. This condition has forced to develop different methods for cloud detection and compensation or for extrapolation. However, these methods which detect and correct cloudy and hazy pixels require an intensive computational effort and pre- and post-processing of the images to avoid degenerating the readings.

It is an object of the current disclosure to establish a method for providing a variable site-specific fertilizer recommendation which can compensate time gaps due to limitations in revisit time and due to the occurrence of clouds and haze and overcomes the above-mentioned problems.

PRIOR ART

Two known approaches related to the compensation of clouds in image data like related to the present invention can be seen in US2020125844 (Climate Corp), wherein a machine learning system is used to, based on a plurality of images already classified as cloud and cloud shadows, train a system for cloud detection; and further in WO2020/160641 A1, wherein another approach is used using multi-layer perceptrons for classification of image segments to generate cloud masks and classify each pixel.

SUMMARY

The current disclosure aims at providing solutions for the above-mentioned problems. Avoiding the computationally intensive cloud-compensating methods require working with the available data at hand on cloud-free days.

According to a first aspect of the present disclosure, this and other objectives are achieved by a method for providing a site-specific variable fertilizer recommendation for a crop at a given point in time, the method comprises the steps of determining at least one agricultural field comprising at least one crop; scheduling a fertilization application for the at least one agricultural field; determining a crop nutrient status of the at least one agricultural field, wherein determining a crop nutrient status of the at least one agricultural field comprises receiving remote data, the remote data comprising image data of the at least one agricultural field and a time stamp indicative of when the image data was taken; generating at least one vegetation index ($SX_{i,j}^{tm}$) indicative of a crop nutrient status based on the image data; determining a crop nutrient status based on the at least one vegetation index; adjusting the crop nutrient status based on the time difference between the time stamp of the image and the scheduled fertilizer application and determining a variable fertilizer recommendation for the at least one agricultural field based on the adjusted crop nutrient status.

Following this approach, outdate remote image data can be used for obtaining a current crop nutrient status.

According to a further embodiment, determining a crop nutrient status of the at least one agricultural field further comprises receiving remote data, the remote data comprising a plurality of image data of the at least one agricultural field at a plurality of dates prior to the fertilizer scheduled application and their respective time stamp indicative of when the image was taken; generating at least one vegetation index ($SX_{i,j}^{t(m-n)}$, . . . , $SX_{i,j}^{t(m)}$) indicative of a crop nutrient status based on the image data for the plurality of image data at a plurality of dates; evaluating the rate of change of the at least one vegetation index generated between each of the plurality of dates for the at least one vegetation index; selecting at least one of the plurality of image data and the corresponding vegetation index based on the respective rate of change; determining the crop nutrient status based on the at least one selected vegetation index.

Following this approach, non-optimal image data can be avoided and despite the time difference further older pictures can be used to compensate for the non-optimal data.

According to a further embodiment, evaluating the rate of change of the at least one vegetation index further comprises averaging the vegetation indexes of each given image data over at least a part of the agricultural field and determining a respective difference between the averaged at least one vegetation index.

Following this approach, the most suitable set of image data can be advantageously selected.

According to a further embodiment, a single image from the plurality of received image data indicative of a crop nutrient status of the at least one agricultural field at a plurality of dates prior to the fertilizer scheduled application and their respective time stamp indicative of when the image data was taken is selected based on the evaluated rate of change and the determination of the crop nutrient status is based on the selected image and the crop nutrient status is adjusted based on the time difference between the time stamp of the selected image and the scheduled fertilizer application.

Following this approach, the time difference for the selected image data is accounted for. According to a further embodiment, the remote data comprising a plurality of image data further comprises selecting amongst the received image data those where the amount of valid pixels of the respective image data is above a predetermined threshold, wherein the validity of the pixels is received with the image data.

Following this approach, non-suitable image data are discarded prior to any evaluation, reducing the computational effort.

According to a further embodiment, adjusting the crop nutrient status comprises determining the crop's dry matter value at the time of the received image data used for generating the at least one vegetation index; simulating the evolution of the crop's dry matter amount of the at least one crop in the at least one agricultural field between the time of the image data and the scheduled fertilizer application; wherein simulating the evolution of the crop's dry matter amount further comprises receiving weather data and iteratively updating the crop's dry matter based on the weather data between the time stamp of the received image data and the scheduled application date; and adjusting the crop nutrient status based on the simulation of the crop's dry matter.

Following this approach, a weather compensated adjustment of the crop nutrient status is achieved.

According to a further embodiment, receiving weather data of the at least one agricultural field further comprises receiving daily temperature and solar irradiance values, and wherein iteratively updating the crop's dry matter value further comprises updating the dry matter value by a generated value proportional to the daily absorbed photosynthetic radiation, calibrated by a temperature efficiency factor.

Following this approach, the crop's dry matter value is adjusted based on temperature and solar irradiance data, achieving a more precise adjustment of the crop nutrient status.

According to a further embodiment, receiving weather data further comprises receiving historic precipitation data and wherein iteratively updating the crop's dry matter value further comprises adjusting the iteratively updated dry matter value according to the soil water content as estimated from a water balance calculation based on the historic precipitation data.

Following this approach, lack of water supply can be accounted for.

According to a further embodiment, determining a variable fertilizer recommendation based on the adjusted crop nutrition status further comprises using additional agronomic parameters like e. g. mineralization potential, yield expectation or weather forecast.

Following this approach, further field parameters can be accounted for in the fertilizer recommendation.

According to a further embodiment, the variable fertilizer recommendation is used to produce a machine-readable prescription map used to control a fertilizer application system.

Following this approach, agricultural machinery can automatically implement the fertilizer recommendation.

According to a further embodiment, scheduling a fertilizer application further comprises determining an application date and time based on at least one of the following: a user input, a received or generated weather forecast, field farm data, predictions of phenological stages, and/or predictions of crop development based on crop growth.

Following this approach, a suitable application date is achieved.

According to further aspects, a system, a data processing apparatus, a computer-readable storage medium, and a computer program product configured to carry out the above discussed methods are envisaged within the present disclosure.

BRIEF DESCRIPTION OF THE FIGURES

The accompanying drawings, which are included to provide a further understanding of the present disclosure and are incorporated in and constitute a part of this specification, illustrate embodiments of the disclosure and together with the description serve to explain the principles of the disclosure.

The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings. Reference will now be made in detail to several embodiments, examples of which are illustrated in the accompanying figures.

DETAILED DESCRIPTION

As used below in this text, the singular forms "a", "an", "the" include both the singular and the plural, unless the context clearly indicates otherwise. The terms "comprise", "comprises" as used below are synonymous with "including", "include" or "contain", "contains" and are inclusive or open and do not exclude additional unmentioned parts, elements or method steps. Where this description refers to a product or process which "comprises" specific features, parts or steps, this refers to the possibility that other features, parts or steps may also be present, but may also refer to embodiments which only contain the listed features, parts or steps.

The enumeration of numeric values by means of ranges of figures comprises all values and fractions in these ranges, as well as the cited end points. The term "approximately" as used when referring to a measurable value, such as a parameter, an amount, a time period, and the like, is intended to include variations of +/−10% or less, preferably +/−5% or less, more preferably +/−1% or less, and still more preferably +/−0.1% or less, of and from the specified value, in so far as the variations apply to the disclosure disclosed herein. It should be understood that the value to which the term "approximately" refers per se has also been disclosed.

Unless defined otherwise, all terms present in the current disclosure, including technical and scientific terms, have the meaning which a person skilled in the art usually gives them. For further guidance, definitions are included to further explain terms which are used in the description of the disclosure.

Figures 1, 2:
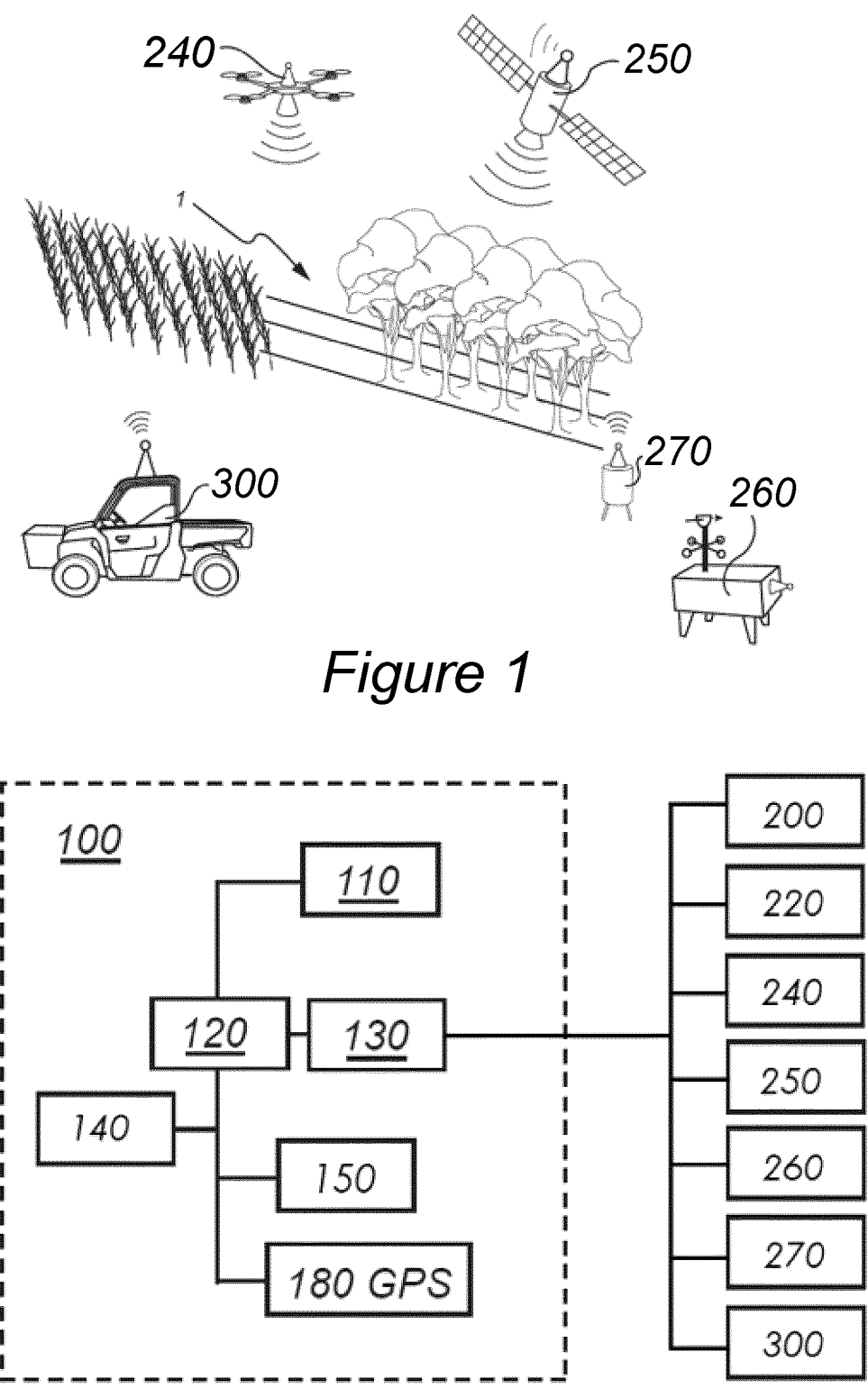
FIG. 1 shows an agricultural field according to the field of application of the present disclosure.
FIG. 2 shows a schematic representation of a system according to an embodiment of the present disclosure.

FIG. 1 depicts an agricultural field comprising a crop within an agricultural field 1 with other systems and apparatus with which the system 100 may interoperate. System 100 of the current disclosure is configured to determine fertilizer recommendations to be carried out in farms and agricultural fields. Agricultural field 1 may comprise crops and forestry areas and may further comprise a network of dedicated agricultural sensors 270 comprising: soil sensors, moisture sensors and other state of the art sensors; and weather stations 260 comprising rain, wind, temperature, solar irradiance, humidity sensors and the like. FIG. 1 further depicts the usual remote sensing devices which are referred to in the current disclosure. Remote sensing devices like satellite imaging system 250 and other aerial vehicles 240 like aircrafts or unmanned aerial vehicles (UAV) are made reference to.

FIG. 2 shows a schematic representation system of the current application according to one embodiment of the current disclosure. System 100, according to the present disclosure, comprises several components such as a memory unit 110, a processor 120, a wired/wireless communication unit 130, an input/output unit 140. The system 100 may as well be operatively connected with a further personal or mobile device 200 by means of the communication unit 130.

System 100 comprises a remote agricultural recommendation engine 220 to which the system may be remotely connected by means of the communication unit 130, may it be of a remote nature. In this case, the remote agricultural recommendation engine 220 may be represented by a computer, a remotely accessible server, other client-server architectures or any other electronic devices usually encompassed under the term data processing apparatus. System 100 does not need to be located within the vicinities of the agricultural field where the recommendation is supposed to take place.

System 100 can be represented as well by a laptop computer or handheld device directly operated by the farmers or users at the location of the agricultural field or not, with an integrated agricultural recommendation engine 150 which can be fully operated at the farm's location and may comprise a GPS unit 180 or any other suitable localization means, as well as a fully remote computer or server configured to establish communication with the further personal or mobile device 200 from which the users may operate the system 100. It is to be understood that the presence of remote and integrate recommendation engines are not mutually excluding. Integrated agricultural recommendation engine 150 can be a local copy of remote agricultural recommendation engine 250 or a light version of it to support periods of low network connectivity and offline work. Further, mobile or personal device 200 is considered to be any state-of-the-art mobile computing device which allows the input and output of data by the users and comprise the usual features.

System 100 and remote or integrated agricultural recommendation engines may comprise field and farm data and external data and/or be configured to receive said data, whereby external data comprises weather data, remote data comprising remote image data and further data provided by weather forecast providers or other third parties. Field data may comprise amongst others current and past data of at least one of the following: field and geographic identifiers regarding the geometry of the boundaries of the agricultural field, including the presence of areas within the agricultural field which are not managed, topographic data, crop identifiers (crop variety and type, growth status, planting data and date, plant nutrition and health status) of current and past crops, harvest data (yield, value, product quality, estimated or recorded historic values), soil data (type, pH, soil organic matter (SOM) and/or cation exchange capacity, CEC). Farm data may comprise further data regarding planned and past tasks like field maintenance practices and agricultural practices, fertilizer application data, pesticide application data, irrigation data and other field reports as well as historic series of the data, allowing the comparison of the data with past data, and the processing of further administrative data like work shifts, logs and other organizational data. Planned and past tasks may comprise further activities like surveillance of plants and pests, application of pesticides, fungicides or crop nutrition products, measurements of at least one farm or field parameter, maintenance and repair of ground hardware and other similar activities.

System 100 may be further configured to receive and/or retrieve soil data from available online soil databases like SoilGrids from the World Soil Information, SSURGO (Soil Survey Geographic Database from the United States Department of Agriculture) or any similar soil data repository, as well as by means of user input.

System 100 may be further configured to receive any of the above mentioned data inputted manually by the users/farmers by means of an input/output unit 140 or the mobile/handheld device 200 or received by the communication unit 130 from the dedicated sensors or data-processing equipment. Further, system 100 and agricultural recommendation engine may be configured to receive weather data from nearby weather stations 260 and/or external crop/farm sensors 270. Nearby weather stations 260 and/or external crop/farm sensors 270 are configured to communicate via one or more networks. In another embodiment, weather data is provided by external weather forecast companies. Weather data may further include present and past series of data, or historic weather data, of the at least one of the following: temperatures, accumulated precipitation, relative humidity, wind speed, solar irradiance, accumulated sun hours and daily absorbed photosynthetic radiation, as well as forecasts of these parameters, etc.

System 100 may further be operatively connected to an agricultural apparatus 300. Examples of agricultural apparatus 300 include tractors, combines, harvesters, planters, trucks, fertilizer equipment, and any other item of physical machinery or hardware, typically mobile machinery, and which may be used in tasks associated with agriculture. In one embodiment, system 100 may be configured to communicate with the agricultural apparatus 300 by means of wireless networks in order to carry out the variable site-specific fertilizer application for the determined crop. System 100 may be further configured to produce a machine-readable script file for the agricultural apparatus to carry out the fertilizer application.

Figure 3:
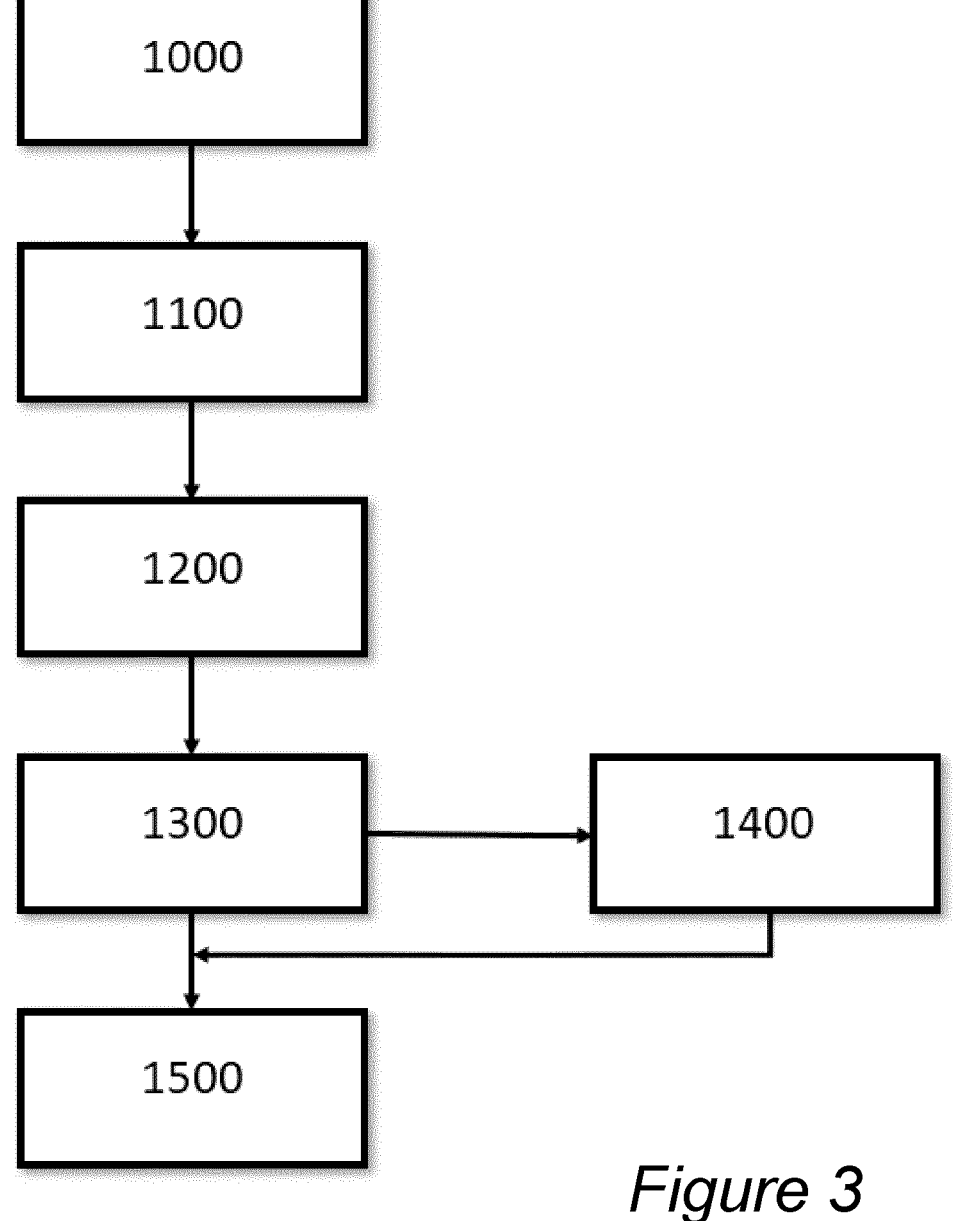
FIGS. 3 and 4 show flow diagrams of methods according to different embodiments of the present disclosure.

FIG. 3 depicts a method according to the main embodiment of the current disclosure. The method of the current disclosure provides 1500 a variable site-specific fertilizer recommendation for a crop at a scheduled point in time. The method of the current disclosure is configured to determine 1000 at least one agricultural field comprising at least one crop and to schedule 1100 a fertilization application for the at least one agricultural field.

A non-limiting example of how the current method may determine at least one agricultural field may be the user providing a predetermined field, but the method of the current disclosure may be configured to automatically retrieve the field for which the recommendation is intended based on farm and/or field data. The agricultural field may be determined as well based on a position of the user, which may be given by the mobile device 200, by the gps unit 180 of the system 100, or the agricultural apparatus 300, depending where the user may be implementing the method of the current disclosure. In a further embodiment, system 100 is configured to determine the boundaries of the determined agricultural field may the determined field not have data regarding the boundary locations in the existing farm data.

The method of the current disclosure is further configured to determine 1200 a crop nutrient status of the at least one agricultural field comprising at least one crop. The method of the current disclosure is configured to determine a crop nutrient status by means of remote imagery as it will be explained below.

As a non-limiting example, the current method may be configured to schedule a fertilization application based on user's input determining the application to be scheduled immediately or at another given point in time. As a further example, the system 100 may be configured to schedule the fertilizer application during an appropriate time for it to be carried out, as it will be described below in a further embodiment.

The present application makes use of suitable remote data for remotely determining the crop nutrient content. Remote data can be referred to data provided by imaging satellites 250 or suitable manned or unmanned imaging aerial vehicles 240. These satellite or vehicle systems are configured to communicate by means of dedicated networks and usual methods which do not need being disclosed herein. Amongst the different remote data available for use, satellite data are nowadays widely available from numerous public (LAND-SAT from NASA, SENTINEL from ESA) and/or private providers. The present method is however not limited to a satellite data platform, since the spectral bands which can be of use for the present method are provided in a big range of the standard satellite data available publicly and privately. Due to the differences present across different satellite and optical sensor platforms, it is hereby not intended to limit the support of the current disclosure to exact and specific wavelengths and the given wavelengths are provided for orientation. While different factors and corrections can be introduced to account for these variabilities, the use of wavelengths proximate to the ones mentioned below should be understood since the specifications of said platforms vary accordingly.

In an embodiment, remote data is obtained from the Sentinel-2 satellite. The Sentinel-2 mission contains a MSI (Multi Spectral Instrument) that takes high spatial resolution data in order to monitor Earth's surface. The MSI works passively, by collecting sunlight reflected from the Earth and is therefore a more efficient and less energy consuming detection method. Sentinel-2 consists of 13 bands with different spatial resolutions (10 m, 20 m or 60 m), in the visible, near infrared, and short-wave infrared part of the spectrum. In an embodiment, the current method uses the image data related to spectral bands with at least a plurality of wavelengths comprised approximately between 700 and 850 nm. In a further embodiment, the present method uses data related to spectral bands with a wavelength of approximately 740 and 780 nm and 900 and 970 nm. The use of Sentinel-2 spectral bands from the MSI produces measurements with a high resolution (approx. 20 m) and is therefore preferred for the implementation of the current disclosure. Sentinel-2 data has however the known disadvantage that it is not available on cloudy days.

In an embodiment, remote data may comprise data relating to different spectral bands used for improving the determination of the present method. Further compensation and calibration algorithms are considered in the present application, depending on the nature and origin of the remote data.

Receiving the remote data comprises receiving image data of the at least one agricultural field, wherein each image data comprises a time stamp indicative of when the image was taken. Once the image data has been received, the method is configured to generate at least one coefficient (or vegetation index) indicative of a crop nutrient status, derived from the image data. Different coefficients or indexes have been used in the literature for obtaining different agricultural, soil and vegetation information like the difference vegetation index and the normalized difference vegetation index (NDVI). However, NDVI is sensitive to the effects of soil brightness, soil color, atmosphere, clouds, cloud shadows, and leaf canopy shadows and requires remote sensing calibration. In that sense, further coefficients contemplated may comprise the Atmospherically Resistant Vegetation Index (ARVI) to reduce the dependence of atmospheric effects; the Soil-Adjusted Vegetation Index (SAVI) or the Type Soil Atmospheric Impedance Vegetation Index (TSARVI) which take into consideration the distinction of vegetation from the different types of soil background. Apart from the standard vegetation indexes comprised in the state of the art, the present application may make use of two further indexes which will be described in more detail below.

In one embodiment, in order to provide a reliable vegetation index or coefficient which is indicative of the above-ground nitrogen uptake present in the vegetation, one of the further indexes of the application may include different wavelengths at the so-called red edge of vegetation between 670 and 800 nm.

In a further embodiment, in order to provide a reliable vegetation index or coefficient which is indicative of the water content present in the vegetation, the remote data may comprise a further remote data comprising further wavelengths at or close to water absorption bands, such as around 950 nm, 1100, 1450 or 1950 nm in order to determine the canopy water content.

In a further embodiment, formulations of a vegetation index according to the present considerations can be expressed as: $SC=f(R760,R730)$, wherein $R760$ and $R730$ represent the reflectance relating to the respective wavelengths received within the remote data, or values closest to them in the respective satellite platform as explained above. The present index is therefore sensitive to the chlorophyll content present in the vegetation and a direct relationship with the total amount of above-ground nitrogen uptake within the canopy can be directly derived. f may in this case be a mathematical relation following the usual established vegetation indexes.

In a further embodiment, in order to provide a reliable vegetation index of coefficient which is indicative of the above-ground fresh or dry matter in the vegetation, the remote data may comprise a further remote data comprising further wavelengths at or close to water absorption bands, such as around 970 nm, 1100 nm, 1450 nm or 1950 nm.

In another embodiment, fresh biomass can e.g. be calculated from $SW=g(R900, R970)$, wherein, as before, $R900$, and $R970$ represent the reflectance at the respective wavelengths received with the remote data, or values closes to them in the respective satellite platform. Function g may be an analogous function to the function f described above.

The above-mentioned list of coefficients (or indexes) is not meant to be limiting. There is a great variance of different coefficients which are as well able of being used by the present method, as mentioned above for computing other properties of agronomical fields (e.g. soil moisture) which although not directly indicative of crop nutrient content, assist the determination of a fertilizer recommendation by improving further insights into other field parameters.

Once the at least one coefficient indicative of the crop status within the agricultural field has been generated, a crop nutrient status can be determined based thereon. Hence, the determination of different factors like chlorophyll, nitrogen uptake and biomass amongst others may be accounted for generating a site-specific location dependent nutrient recommendation. However, these approaches based on remote data cannot account for the occurrence of clouds and the disadvantages which this event entails.

Due to the presence of clouds and the limited availability of remote image data due to the revisiting time of remote imagery providers (e.g. Sentinel platform has a revisiting time of 2-3 days in Europe) or the mere availability of UAVs or plane imagery, remote image data may be between a couple of days old in the best case and couple of weeks old during cloudy seasons. Since the scheduled application may take place as well with a certain time difference, there is a need for compensating this time disparity between remote image data and the fertilizer application date.

As such, the current method is configured to receive remote data comprising image data of the at least one agricultural field with a time stamp indicative of when the image was taken and to adjust the crop nutrient status, based on which a variable site-specific fertilizer recommendation is produced, based on the time difference between the time stamp of the image and the scheduled fertilizer application.

Hence, the current method is configured to adjust 1300 the determined crop nutrient status based on the time difference between the time stamp of the image and the scheduled fertilizer application. In a further embodiment, the adjustment of the determined crop nutrient status may be carried out by means of a function proportional to the time difference between the date of the received image data and the scheduled fertilizer application. In a further embodiment, the method may be configured to adjust the determined crop nutrient based on an expected development of the crop according to a crop growth model and/or using weather data between the date of the received image data and the scheduled fertilizer application. As mentioned above, due to the limited availability of remote image data on cloud-free days, crop nutrient status and the corresponding fertilizer recommendation may be based on an "outdated" image. By taking the time difference between the two events into consideration, an improved fertilizer recommendation and application is achieved.

The current method is further configured to determine 1500 a variable site-specific fertilizer recommendation for the at least one agricultural field based on the adjusted crop nutrient status.

As a general rule, users/farmers may schedule a fertilizer application immediately, within the same day or prepare it for a couple of days ahead when suitable conditions (weather conditions, crop growth stages, administrative or personal) occur. This temporal delay has a further effect on the optimal fertilizer recommendation the current application can account for. This might entail receiving pictures made within a week of the future fertilizer application. However, due to unfavorable weather conditions, the current method may comprise receiving pictures taken within a month or longer of the future fertilizer application. For example, in some locations the availability of remote image data less than 2 days old suitable for agricultural purposes is lower than 30%. While that percentage increases, another 30% of image data are spaced apart more than a week, due to the occurrence of clouds. Thanks to the method of the current disclosure, an accurate compensation for the relative time difference can be accounted for, while rendering unnecessary the use of cloud compensation algorithms which render more remote image data available for the days closest to the fertilizer application date, in order to get an accurate determination of the current crop nutrient status.

When receiving remote image data, usual image data providers deliver a given classification of the pixel category, according to the table below.

TABLE 1

| Label | Classification |
|-------|----------------|
| 0 | NO_DATA |
| 1 | SATURATED_OR_DEFECTIVE |
| 2 | DARK_AREA_PIXELS |
| 3 | CLOUD_SHADOWS |
| 4 | VEGETATION |
| 5 | NOT_VEGETATED |
| 6 | WATER |
| 7 | UNCLASSIFIED |
| 8 | CLOUD_MEDIUM_PROBABILITY |
| 9 | CLOUD_HIGH_PROBABILITY |
| 10 | THIN_CIRRUS |
| 11 | SNOW |

Thanks to this provided classification, excluding images which might not be of sufficient quality is not a cumbersome procedure. As it can be found below, when image data has pixels classified as other than vegetated, not vegetated, or dark or unclassified (labels 2,4,5,7) over a certain limit, the use of said image data cannot be guaranteed to deliver a meaningful result and the pixel is classified as not valid. Hence, the present method may be configured, in a further embodiment, to identify and exclude cloudy image data before processing for generation of the at least one vegetation index. In order to avoid the processing of cloudy images from the received remote data, identification of the to be excluded images is carried out according to the following rule, following the classification shown in Table 1, wherein SCL refers to the scene classification following the columns of Table 1.

$$\frac{\text{Number of pixels with } SCL \notin \{2, 4, 5, 7\}}{\text{Total number of pixels}} > C_{cloud}$$

It is to be understood that the location of the different pixels refers to the pixels comprised within the at least one determined agricultural field for the acceptability criteria of the received image data. Hence, the method is further adapted to determine which pixels located within the agricultural field from each image data received satisfies the above listed conditions and the overall relation. Depending on the number and availability of pictures $C_{cloud}$ can be adjusted by setting a predetermined threshold. In a preferred embodiment $C_{cloud}$ is a fixed constant at a value of 0.05. $C_{cloud}$ can however be varied to levels comprised between 0.01 and 0.1. Due to this classification, cloudy or defective pictures which would otherwise compromise the reliability of the vegetation indexes are excluded. Moreover, the amount of pictures to be processed is reduced hereby reducing the computational effort.

Figure 5:
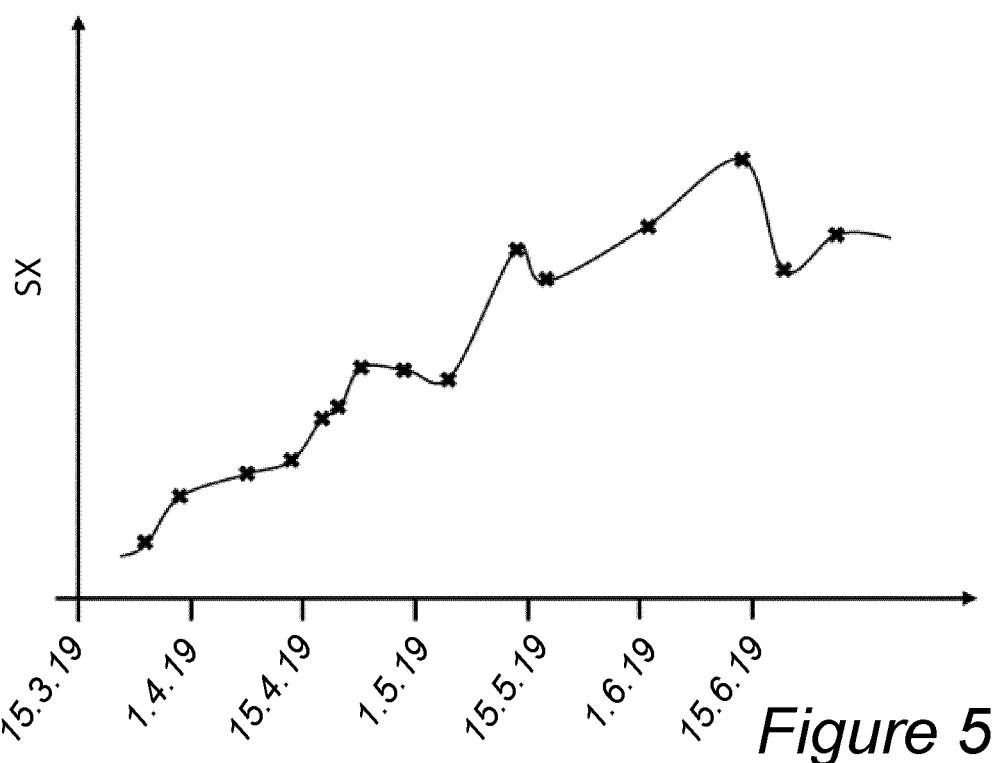
FIG. 5 shows an example of a possible evolution of a vegetation index over a time period representative of crop season for demonstrative purposes of the current application.

In a further embodiment, the method of the current disclosure is configured to receive remote data, wherein the remote data comprises a plurality of cloud-free image data at a plurality of dates prior to the fertilizer scheduled application. The plurality of received image data comprises a respective time stamp indicative of when the image was taken. While looking at the most recent available and cloud-free remote image data for a truthful representation of the crop status at the application time is desired, the most recent available and cloud-free remote image data might still be locally affected by local, or otherwise unaccounted for, clouds, haze or other atmospheric events which might blurr or affect the quality of the image data. This can be seen when the progression of the generated at least one vegetation index does not follow the expected evolution. For example, as it can be seen in FIG. 5, such a decay at certain points in time may be caused in the available set of remote image data. As FIG. 5 shows, around the end of April, beginning of May, there are few remote image data available (as marked in the Figure by the crosses present along the line). Further, as it can be seen in the Figure, some of the remote image data available do not depict an actual truthful representation of the crop nutrient status due to this mentioned unexpected variation caused by the decrease of the at least one vegetation index depicted in the Figure. Hence, for example, users/farmers aiming to schedule a fertilizer application towards the end of the beginning of the second week of May at the end of the first week in May might feel compelled to use the generated coefficient from the most recent image data. While the main embodiment of the current application already offers a compensation for the time passed between the last available remote image data and the scheduled fertilizer application date is provided, further advantages of the present embodiment will be made clear below.

The method of the current application may be further configured to generate at least one vegetation index indicative of a crop nutrient status based on selected image data amongst the plurality of remote image data taken at the plurality of times. For example, denominating SX a certain vegetative index (which can take different forms depending on the respective vegetation index), a vegetation index $SX^{t(m)}$ refers to the index being generated from the image taken at a point in time m, wherein m might be the most recent available remote image data. As such, further generated indexes can be referred to as $SX^{t(m)}$, $SX^{t(m-1)}$, . . . , $SX^{t(m-n)}$ for the case when there are n previous remote image data available for the current method in order to generate the respective at least one vegetation index indicative of the crop nutrient status.

Moreover, the at least one generated vegetative index may be computed at pixel level instead of at field level, in which case the generated index for the respective remote image data at a given pixel (i,j) may be denominated as $SX_{(i,j)}^{t(m-p)}$ and the corresponding averaged vegetative index for the at least one agricultural field SX is computed as the average of the pixel-wise vegetation index over the respective at least one agricultural field.

In this embodiment, the current method may be further configured to evaluate the rate of change of the at least one vegetation index, pixel-wise or the corresponding averaged value of the vegetation index over the at least one agricultural field between each of the plurality of dates for which a remote image data is available. Further, the current method may be configured to select at least one of the plurality of image data, based upon which the at least one vegetation indexes are generated, in order to determine the crop nutrient status, based on the computed rate of change. As such, the computation of a Rate of Change (RoC) for a given index $SX^{m+1}$ at point in time m+1 is as follows:

$$RoC(SX^{m+1}) =$$

-continued
$$(SX^{t(m+1)} - SX^{t(m)})/(\text{Amount of days between images } m \text{ and } m+1)$$

In view of the evaluated Rate of Change for the at least one determined index, the present method may be further configured to select at least one of the plurality of received image data based on the Rate of Change.

Thanks to the advantageous evaluation of which of the most recent available pictures are better suited for the determination of the crop nutrient status, the current method provides a more accurate determination of said crop nutrient status.

Figure 7:
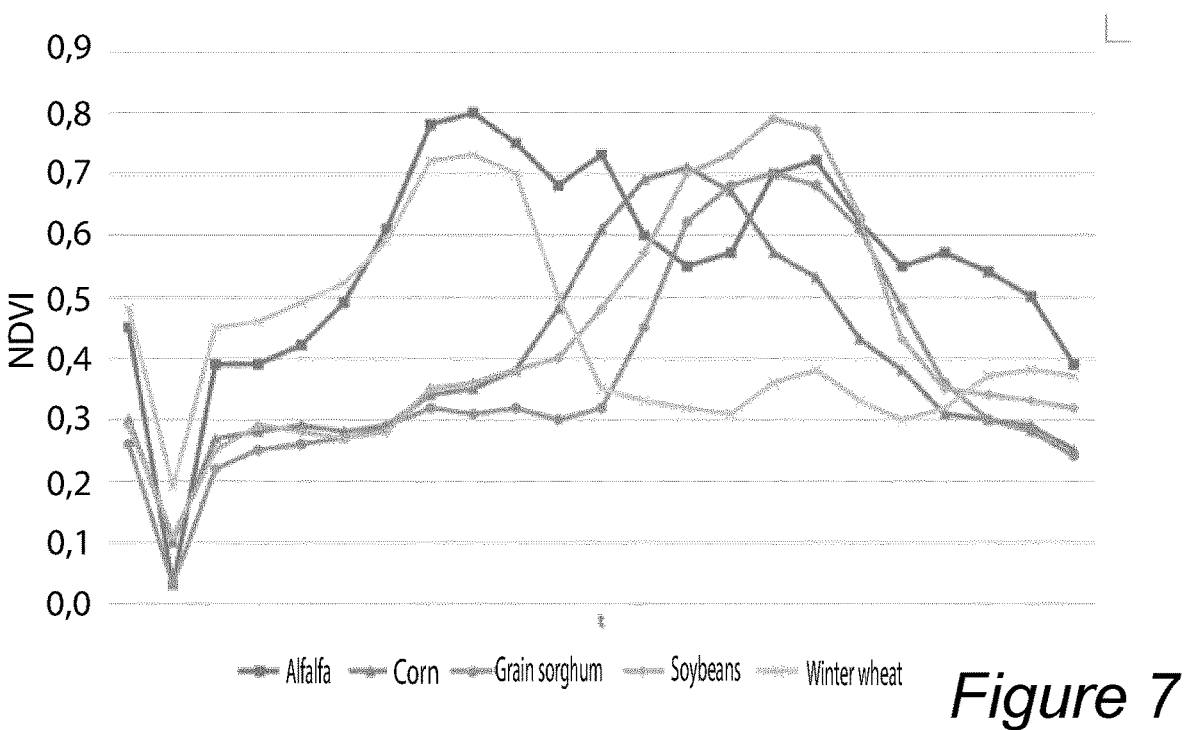
FIG. 7 shows different standard evolutions of vegetation indexes of different crop types over a growing season.
Figure 8:
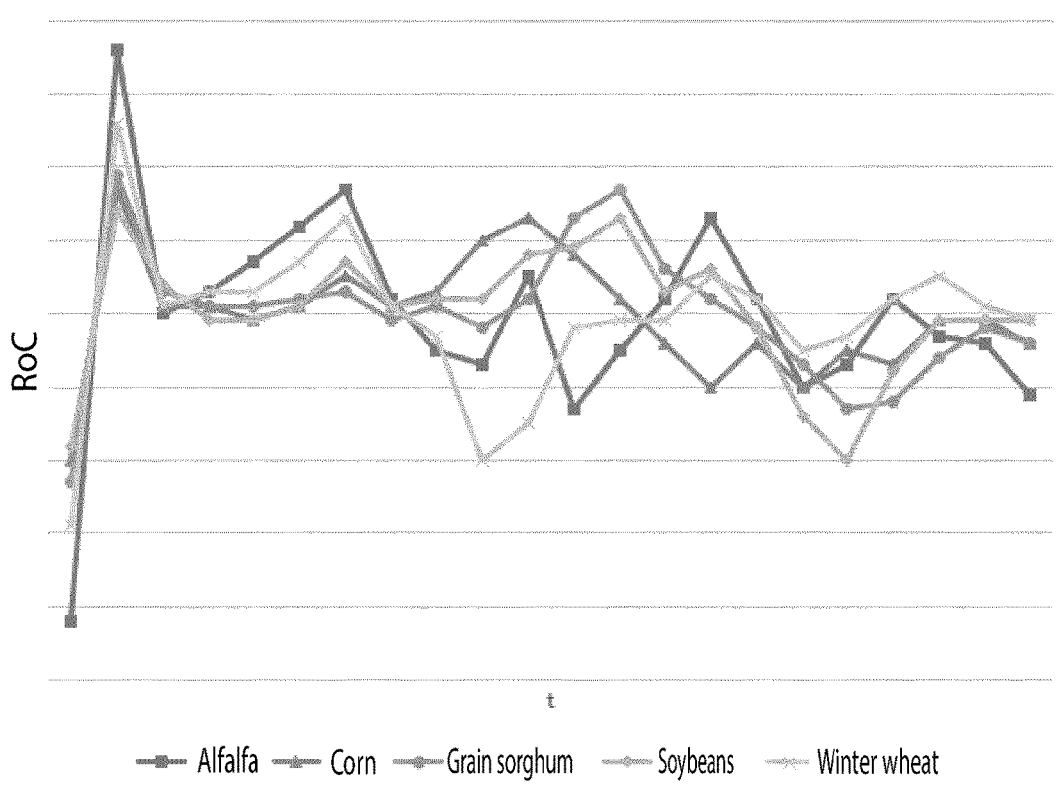
FIG. 8 shows the rate of change of the vegetation indexes for different crop types over a growing season.

In a further embodiment, the current method may be further configured to compare the respective rate of change with a predefined value. In a further embodiment, the current method may be further configured to compare the respective rate of change with the rate of change of the previous interval (e.g., RoC ($SX^{t(m+1)}$) compared with RoC ($SX^{t(m)}$). in a further embodiment, the rate of change may be compared with a predefined rate of change calibrated for the specific type of crop present in the agricultural field adapted for the time frame comprised between the respective remote image data defining the RoC. As it can be seen in FIGS. 7 and 8, based on the determined crop, an expected behavior of the at least one vegetation index can be inferred. Hence, the current method may be further configured to compare the determined Rate of Change with a threshold value. In a further embodiment, the threshold value for the rate of change of the at least one vegetation index may be further determined based on the rate of change of the at least one vegetation index for the determined time period as determined from the existing values of a vegetation index for a given crop at that time period.

While the expressions used above for the vegetation index have been shown for the general representation, the current method may be further configured to include a pixel-wise determination of each at least one vegetation index and the respective determination of the rate of change. The above listed equation would then read for a pixel-wise case as follows:

$$RoC(SX)_{(i,j)}^{m+1} =$$
$$(SX_{(i,j)}^{t(m+1)} - SX_{(i,j)}^{t(m)})/(\text{Amount of days between images } m \text{ and } m+1)$$

Further, the current method may be configured to process the at least one vegetation indexes of a given remote image data for a given date over at least a part of the agricultural field, wherein processing the vegetation indexes further comprises evaluating the rate of change of the at least one vegetation index further comprises averaging the at least one vegetation index of each given image data over at least a part of the agricultural field and determining a respective difference between the averaged at least one vegetation index.

Figure 6:
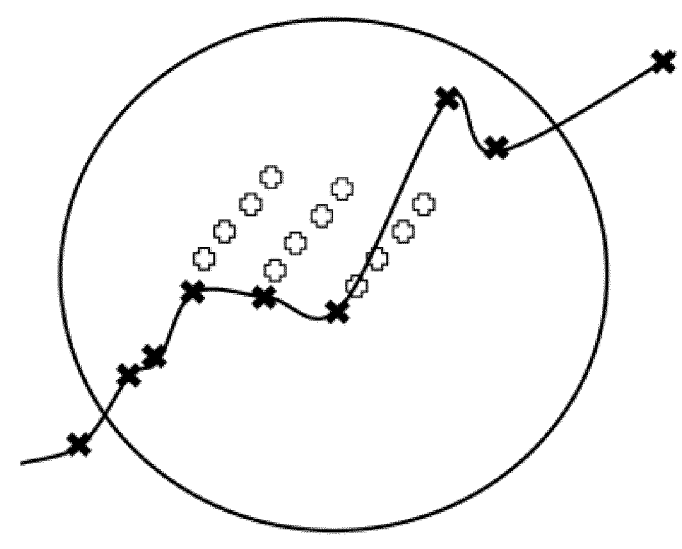
FIG. 6 shows a detailed view of the previous figure according to one of the embodiments of the present disclosure.

In a further embodiment, adjusting the crop nutrient status based on the time difference between the time stamp of the image and the scheduled fertilizer application may further comprise determining the crop's dry matter value at the time of the selected image data based on at least one of the vegetation indexes and simulating the evolution of the crop's dry matter value of the at least one crop in the at least one agricultural field between the time of the selected image data and the scheduled fertilizer application. Under the assumption that no water stress is present and in absence of other growth limiting factors, the crop's dry matter value evolution can be accurately predicted based on the below disclosed simulation. The current embodiment further comprises simulating the evolution of the crop's dry matter value based on received weather data of the at least one agricultural field between the time stamp of the image data and the scheduled fertilizer application and iteratively updating the crop's dry matter value, based on the weather data between the time stamp of the image data and the scheduled application date. FIG. 6 represents a close-up view of FIG. 5 around the expected dates for scheduling the fertilizer application as discussed above. As it can be seen in the Figure, after a rapid increase of the vegetation index, there is a series of values decreasing in value followed by an even more rapid increase with a certain overshoot. These behaviors are not always justified due to the crop nature and may represent image data artifacts or sub-optimal readings. As such, in view of the above mentioned embodiment, the method may be further configured to simulate the evolution of the crop's dry matter, which are exemplarily indicated as the empty crosses departing from the bold crosses representing the dates at which the image data is available, herewith adjusting the crop nutrient value.

As a non-limiting example, determining the crop's dry matter value ($DM_0$) may be based on at least one vegetation index from the received remote image data as explained above.

Figure 4:
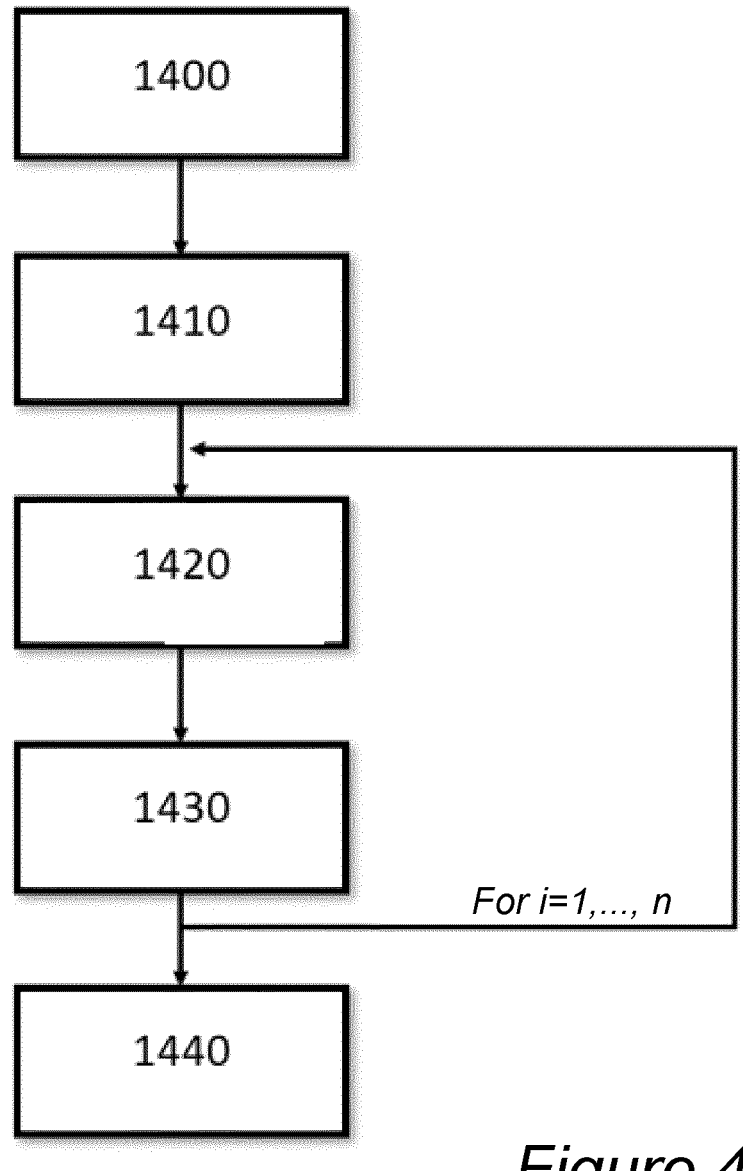

In a further embodiment, iteratively updating 1400 the crop's dry matter value may be carried out following the diagram flow shown in FIG. 4. The method of the current application may be further configured to iteratively update the crop's dry matter value by a generated value proportional to the daily absorbed photosynthetic radiation, calibrated by a temperature efficiency factor. Once the dry matter value has been determined 1410 at the date of the selected image data, an iterative scheme as depicted in FIG. 4 for updating the dry matter value based on weather data is presented. Following the present embodiment, a daily dry matter value ($DM_{i+1}$) is generated 1430 based on the dry matter value from the previous day ($DM_i$) and a development factor which is added to the dry matter value. According to a non-limiting example, the development factor is determined 1420 based on the daily absorbed photosynthetic radiation, the daily temperature evolution and different calibrating factors. This operation is then repeated over the number of days comprised between the date of the image data and the scheduled fertilizer application until a final dry matter value is computed ($DM_{end}$). Based on the computed dry matter value, the crop nutrient status is adjusted 1440 for the scheduled time of fertilizer application, achieving therefore a more accurate fertilizer recommendation which reflects the current nutrient status of the crop. For example, at the date when the image data was taken, nutrient status is given by the vegetation index and calibrated for the given dry matter at that date. Following the iterative approach, the dry matter evolution is as follows:

$$DM_{i+1} = DM_i + k * h(DM_i) * E_i * f_T(T_i)$$

This iteration is carried out for i=1, . . . , n; wherein n represents the number of days between the date of the image data and the fertilizer application date and wherein k represents a constant which may take different values based on crop data. Function h is proportional to the daily fraction of absorbed photosynthetic radiation; $E_i$ is the daily solar irradiance, function $f_T$ is a temperature calibrated function which represents a temperature efficiency factor as a function of the daily temperature. In an embodiment, function $f_T$ may be defined as a function of the daily temperature evolution. In a further embodiment, the function $f_T$ may be defined as a function of the daily average temperature and maximum and minimum values.

As such, at the date of the fertilizer application, the current method delivers an updated dry matter value for the determined crop present in the agricultural field which allows the determination of the adjusted crop nutrient status based on $DM_n$. The variable fertilizer recommendation for the at least one agricultural field is then determined based on a current value of the crop nutrient status, wherein the nitrogen uptake is determined at the data of fertilizer application in view of the dry matter value computed for the fertilizer application date.

In a further embodiment, the current method may be further configured to receive historic precipitation data. In this embodiment, iteratively updating the crop's dry matter value further comprises adjusting the iteratively updated dry matter value according to the historic precipitation data. For example, in a non-limiting example, the soil water content can be estimated from a water balance calculation based on the historic precipitation data over the season, as such that a limit threshold for the soil water content can be established and the iteratively updated dry matter value can be correspondingly updated.

In a further embodiment, the method being configured to schedule a fertilizer application may further comprise determining an application date and time based on at least one of the following: a user input, a received or generated weather forecast, field farm data, predictions of phenological stages, and/or predictions of crop development based on crop growth. As mentioned above, the users or farmers may want to schedule a fertilizer application at their convenience and determine a fixed date which suits their calendars. However, the current method may be further configured to automatically determine a suitable fertilizer application date and time. In view of the weather forecasts, the current method may be further configured to determine the date and time based on specific weather events which might impair or deteriorate the efficiency of the fertilizer application. Further, the method may be further configured to determine the scheduled fertilizer application date based on a model prediction of the crop growth or phenological stages. As such, the method of the current application may conveniently determine the scheduled fertilizer application date when it is best suited for the crop.

In a further embodiment, the current method may be configured to determine a variable fertilizer recommendation based on the adjusted crop nutrition status may further comprise using at least one of the additional agronomic parameters: mineralization potential, yield expectation or weather forecast.

In a further embodiment, the current method may be configured to produce a machine-readable application prescription map based on the variable fertilizer recommendation to control a fertilizer application system. The current method may be further configured to establish direct communication with an agricultural machinery 300 over standard networks to carry out the fertilizer application in an automatized manner. In a further embodiment, the current method may be configured to produce a downloadable script or file, which can be used for uploading such an application prescription map by physical means to a fertilizer application system.

In a further embodiment, the variable fertilizer recommendation is carried out by means of a fertilizer application system, like a spreader or specially adapted agricultural machinery.

FIGS. 3 and 4 show workflows of different embodiments comprised within the methods of the present disclosure. Although the process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product. While the foregoing describes various embodiments of the disclosure, other and further embodiments of the disclosure may be devised without departing from the scope thereof. The scope of the disclosure is determined by the claims that follow. The disclosure is not limited to the described embodiments, versions or examples, which are included to enable a person having ordinary skill in the art to make and use the disclosure when combined with information and knowledge available to the person having ordinary skill in the art.

While the use of plural nouns has been preferred throughout the disclosure when referring to persons (the users, the farmers) in order to allow a gender-neutral drafting of the text, there is hereby no limitation intended as to the number of persons which the current disclosure should be considered related to. This has been carried out in light of the amendments to the guidelines entered in force on 1st of March 2021 supporting gender-neutrality and as an example for others.

While the present disclosure has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The disclosure in its broader aspects is therefore not limited to the specific details, representative apparatus and method, and illustrative example shown and described.

Accordingly, the detailed description thereof should not be construed as restrictive in all aspects but considered as illustrative. The scope of the disclosure should be determined by reasonable interpretation of the appended claims and all changes that come within the equivalent scope are included in the scope of the current disclosure.

The invention claimed is:

1. A computer-implemented method for providing a site-specific variable fertilizer recommendation for a crop at a given point in time, the method performed by executing a computer program on a processor and comprising steps of:

a. determining at least one agricultural field comprising at least one crop;

b. scheduling a fertilization application for the at least one agricultural field for a scheduled application date;

c. remotely determining a crop nutrient status of the at least one agricultural field, wherein remotely determining a crop nutrient status of the at least one agricultural field comprises:

i. receiving remote data, via a communication unit, the remote data comprising image data of the at least one agricultural field and a time stamp indicative of when the image data was taken, the remote data provided by at least one remote sensing device including at least one imaging satellite or imaging aerial vehicle;

ii. generating, by executing the computer program on the processor, at least one vegetation index ($SX_{i,j}^{tm}$) indicative of a crop nutrient status based on the image data;

iii. determining, by executing the computer program on the processor, a crop nutrient status based on the at least one vegetation index;

d. adjusting, by executing the computer program on the processor, the crop nutrient status based on a time difference between the time stamp of the image data and the scheduled fertilizer application, wherein adjusting the crop nutrient status comprises:

i. determining, by executing the computer program on the processor, a dry matter value of the at least one crop at the time of the received image data used for generating the at least one vegetation index;

ii. simulating, by executing the computer program on the processor, an evolution of the dry matter value of the at least one crop in the at least one agricultural field between the time of the image data and the scheduled fertilizer application;

iii. wherein simulating the evolution of the dry matter value further comprises receiving weather data via the communication unit and iteratively updating the crop's dry matter based on the weather data between the time stamp of the received image data and the scheduled application date; and iv. adjusting, by executing the computer program on the processor, the crop nutrient status based on the simulation of the crop's dry matter;

e. determining, by executing the computer program on the processor, a variable fertilizer recommendation for the at least one agricultural field based on the adjusted crop nutrient status;

f. generating, by executing the computer program on the processor, a machine-readable prescription map based on the variable fertilizer recommendation; and g. controlling an agricultural apparatus using the machine-readable prescription map to perform the site-specific variable fertilizer application, wherein receiving the weather data of the at least one agricultural field further comprises receiving daily temperature and solar irradiance values, and wherein iteratively updating the crop's dry matter value further comprises updating the dry matter value by a generated value proportional to a daily absorbed photosynthetic radiation, calibrated by a temperature efficiency factor, wherein iteratively updating the crop's dry matter comprises generating a daily dry matter value ($DM_{i+1}$) based on the dry matter value from a previous day ($DM_i$) and a development factor as follows:

$$DM_{i+1} = DM_i + k * h(DM_i) * E_i * f_T(T_i)$$

wherein the iteration is carried out for i=1, ..., n; wherein n represents a number of days between the date of the image data and the fertilizer application date and wherein k represents a constant which may take different values based on crop data, wherein function h is proportional to a daily fraction of absorbed photosynthetic radiation; $E_i$ is a daily solar irradiance, and function $f_T$ is a temperature calibrated function which represents a temperature efficiency factor as a function of the daily temperature.

2. The method of claim 1, wherein determining a crop nutrient status of the at least one agricultural field further comprises:

a. receiving remote data, the remote data comprising a plurality of image data of the at least one agricultural field at a plurality of dates prior to the fertilizer scheduled application and their respective time stamp indicative of when the image was taken;

b. generating at least one vegetation index ($SX_{i,j}^{t(m-n)}$, ..., $SX_{i,j}^{t(m)}$) indicative of a crop nutrient status based on the image data for the plurality of image data at a plurality of dates;

c. evaluating a rate of change of the at least one vegetation index generated between each of the plurality of dates for the at least one vegetation index;

d. selecting at least one of the plurality of image data and a corresponding vegetation index based on the respective rate of change;

e. determining the crop nutrient status based on the at least one selected vegetation index.

3. The method of claim 2, wherein evaluating the rate of change of the at least one vegetation index further comprises averaging the vegetation indexes of each given image data over at least a part of the agricultural field and determining a respective difference between the averaged at least one vegetation index.

4. The method of claim 2, wherein a single image from the plurality of received image data indicative of a crop nutrient status of the at least one agricultural field at a plurality of dates prior to the fertilizer scheduled application and their respective time stamp indicative of when the image data was taken is selected based on the evaluated rate of change and the determination of the crop nutrient status is based on the selected image and the crop nutrient status is adjusted based on the time difference between the time stamp of the selected image and the scheduled fertilizer application.

5. The method of claim 2, wherein the remote data comprising the plurality of image data further comprises selecting amongst the received image data those where an amount of valid pixels of the respective image data is above a predetermined threshold, wherein the validity of the pixels is received with the image data.

6. The method of claim 1, wherein receiving the weather data further comprises receiving historic precipitation data and wherein iteratively updating the crop's dry matter value further comprises adjusting the iteratively updated dry matter value according to the historic precipitation data.

7. The method of claim 1, wherein determining the variable fertilizer recommendation based on an adjusted crop nutrition status further comprises using at least one of additional agronomic parameters: growth stage, crop type, crop variety, mineralization potential, yield expectation or weather forecast.

8. The method according to claim 1, wherein scheduling a fertilizer application further comprises determining an application date and time based on at least one of: a user input, a received or generated weather forecast, field farm data, predictions of phenological stages, and/or predictions of crop development based on crop growth.

9. A system for providing a fertilizer recommendation comprising a communication unit, configured to carry out the method according to claim 1.

10. The system for providing the fertilizer recommendation according to claim 9, wherein the system is configured to communicate with the agricultural apparatus by means of the communication unit, and wherein the agricultural apparatus is configured to carry out the variable site-specific fertilizer application for the determined crop.

11. A data processing apparatus comprising means for carrying out the method of claim 1.

12. A computer-readable storage medium comprising the program with instructions which, when executed by a computer system comprising the processor, cause the computer system to carry out the method of claim 1.

13. A computer program product comprising the program with instructions which, when the program is executed by a computer comprising the processor, cause the computer to carry out the method of claim 1.

14. The method of claim 1, further comprising wirelessly transmitting, via the communication unit, the machine-readable prescription map to the agricultural apparatus configured to carry out the variable fertilizer recommendation.

\* \* \* \* \*